United States Patent
Li et al.

(10) Patent No.: US 10,863,198 B2
(45) Date of Patent: Dec. 8, 2020

(54) INTRA-PREDICTION METHOD AND DEVICE IN IMAGE CODING SYSTEM FOR 360-DEGREE VIDEO

(71) Applicant: LG Electronics Inc., Seoul (KR)

(72) Inventors: Ling Li, Seoul (KR); Seunghwan Kim, Seoul (KR); Jaehyun Lim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/475,978

(22) PCT Filed: Sep. 29, 2017

(86) PCT No.: PCT/KR2017/011003
§ 371 (c)(1),
(2) Date: Jul. 3, 2019

(87) PCT Pub. No.: WO2018/128247
PCT Pub. Date: Jul. 12, 2018

(65) Prior Publication Data
US 2019/0335203 A1    Oct. 31, 2019

Related U.S. Application Data

(60) Provisional application No. 62/441,596, filed on Jan. 3, 2017, provisional application No. 62/441,597, filed on Jan. 3, 2017.

(51) Int. Cl.
*H04N 19/597* (2014.01)
*H04N 19/105* (2014.01)
(Continued)

(52) U.S. Cl.
CPC ......... *H04N 19/597* (2014.11); *H04N 19/105* (2014.11); *H04N 19/11* (2014.11);
(Continued)

(58) Field of Classification Search
None
See application file for complete search history.

(56) References Cited

U.S. PATENT DOCUMENTS 10,375,375 B2 *   8/2019  Hwang ............... H04N 13/178
2015/0341552 A1  11/2015  Chen et al.
(Continued)

FOREIGN PATENT DOCUMENTS

KR   10-2013-0091800    8/2013
KR   10-2016-0143588   12/2016

OTHER PUBLICATIONS

Ma et al. "Co-projection-plane based motion compensated prediction for cubic format VR content," JVET-D0061, Joint Video Exploration Team (JVET) of ITU-T SG 16 WP 3 and ISO/IEC JTC 1/SC 29/WG 11, 4th Meeting: Chengdu, CN, Oct. 15-21, 2016, 6 pages.
(Continued)

*Primary Examiner* — Tyler W. Sullivan
(74) *Attorney, Agent, or Firm* — Fish & Richardson P.C.

(57) ABSTRACT

An intra-prediction method executed by a decoding device, comprising the steps of receiving 360-degree video information, on the basis of the 360-degree video information, deriving a prediction mode of a target block in a target face of a projected picture, deriving reference samples for the target block in a reference face of the projected picture, and deriving prediction samples of the target block on the basis of the reference samples in the reference face.

14 Claims, 12 Drawing Sheets

(51) Int. Cl.
*H04N 19/11* (2014.01)
*H04N 19/176* (2014.01)
*H04N 19/593* (2014.01)
*H04N 19/70* (2014.01)

(52) U.S. Cl.
CPC ......... *H04N 19/176* (2014.11); *H04N 19/593* (2014.11); *H04N 19/70* (2014.11)

(56) References Cited

U.S. PATENT DOCUMENTS

| | | | |
|---|---|---|---|
| 2017/0230668 A1* | 8/2017 | Lin | H04N 19/563 |
| 2017/0339417 A1* | 11/2017 | Puri | G06K 9/4652 |
| 2018/0332305 A1* | 11/2018 | Lin | H04N 19/184 |
| 2018/0359487 A1* | 12/2018 | Bang | H04N 19/50 |
| 2019/0007679 A1* | 1/2019 | Coban | H04N 19/105 |
| 2019/0089961 A1* | 3/2019 | Ahn | H04N 19/105 |
| 2019/0158825 A1* | 5/2019 | Ma | H04N 19/167 |
| 2019/0200023 A1* | 6/2019 | Hanhart | H04N 19/167 |
| 2019/0342578 A1* | 11/2019 | Lee | H04N 19/52 |
| 2019/0342581 A1* | 11/2019 | Deshpande | H04N 19/174 |
| 2019/0349598 A1* | 11/2019 | Aminlou | H04N 19/105 |
| 2019/0373287 A1* | 12/2019 | Lim | H04N 19/597 |
| 2019/0379877 A1* | 12/2019 | Oh | H04N 13/117 |
| 2020/0021791 A1* | 1/2020 | Hur | H04N 21/26258 |
| 2020/0029092 A1* | 1/2020 | Rath | H04N 19/176 |

OTHER PUBLICATIONS

Jiang, "Cubic-panorama image dataset compression for image-based virtual environment navigation," PhD Thesis 2009, (Dec. 31, 2009), uOttawa Theses (/handle/10393/242) Theses, 1910-2010 (/handle/10393/244), 224 pages.

* cited by examiner

FIG. 2
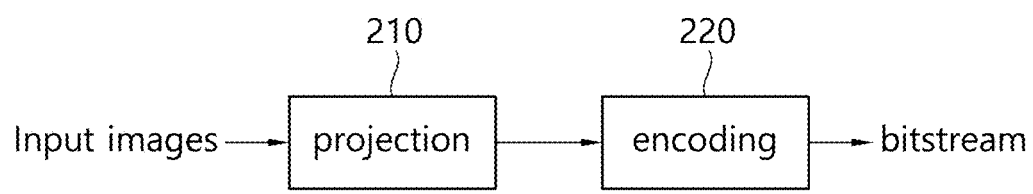
(a)
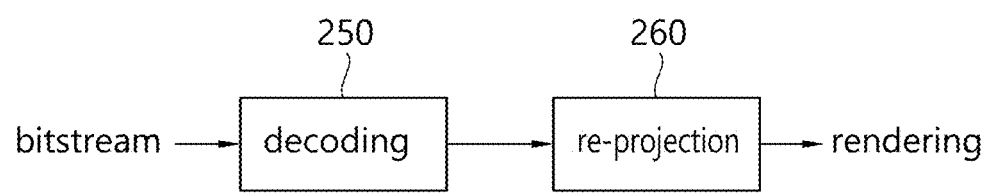
(b)

FIG. 5
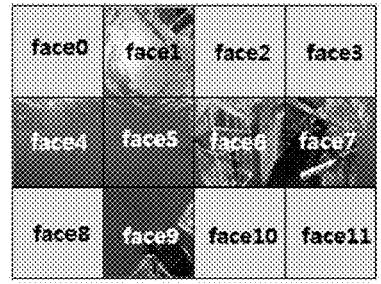
(a)
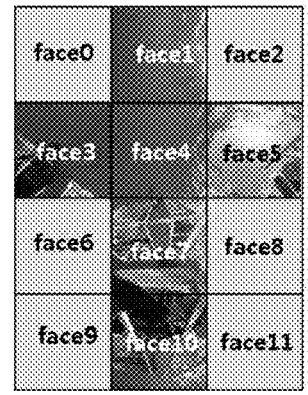
(b)
(c)
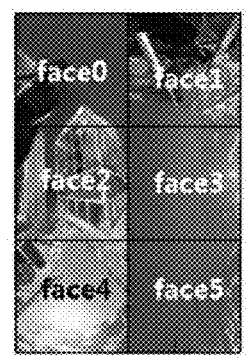
(d)
(e)
(f)

FIG. 7
(a) 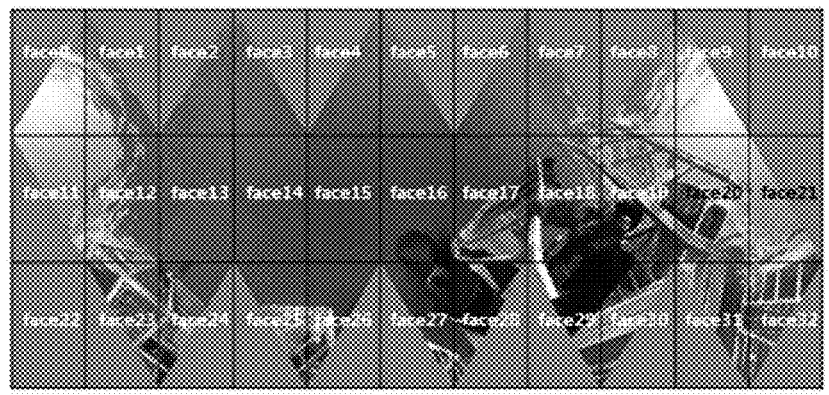
(b) 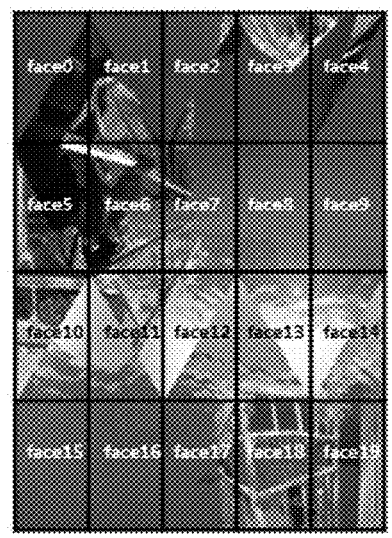
(c) 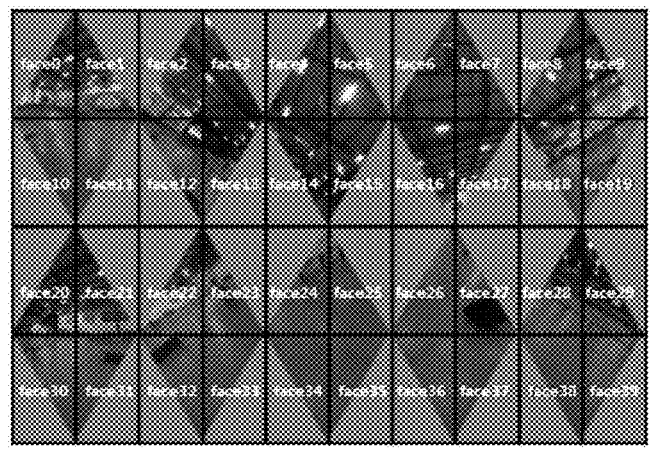

FIG. 9
(a) 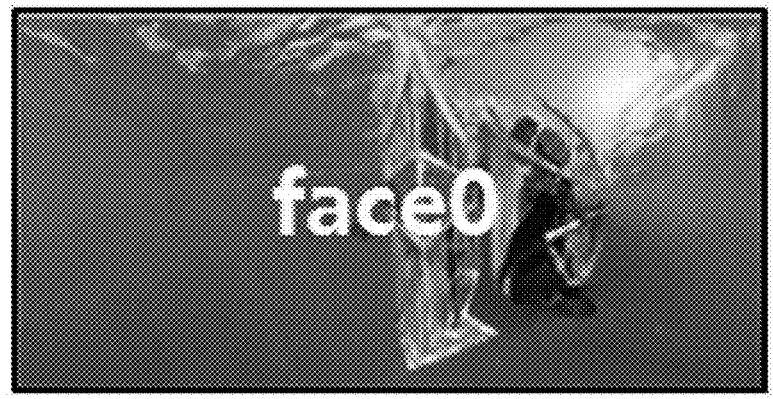
(b) | face0 | face1 | face2 | face3 | face4 | face5 |
(c) 

INTRA-PREDICTION METHOD AND DEVICE IN IMAGE CODING SYSTEM FOR 360-DEGREE VIDEO

CROSS-REFERENCE TO RELATED APPLICATIONS

This application is a National Stage application under 35 U.S.C. § 371 of International Application No. PCT/KR2017/011003, filed on Sep. 29, 2017, which claims the benefit of U.S. Provisional Application No. 62/441,596, filed on Jan. 3, 2017, and U.S. Provisional Application No. 62/441,597, filed on Jan. 3, 2017. The disclosures of the prior applications are incorporated by reference in their entirety.

BACKGROUND OF THE INVENTION

Field of the Invention

The present invention relates to a 360-degree video, and more particularly, to an intra-prediction method and apparatus in a coding system regarding a 360-degree video.

Related Art

A 360-degree video may refer to a video or image content captured or reproduced in all directions (360-degrees), which is required for providing a virtual reality (VR) system. For example, the 360-degree video may be represented on a three-dimensional spherical surface. The 360-degree video may be provided by capturing an image or video regarding each of a plurality of viewpoints through at least one camera, connecting a plurality of captured images/videos to create a single panoramic image/video or spherical image/video, protecting the created image/video on a 2D picture, coding the projected picture, and transmitting the coded picture.

Because a transmitted information amount or bit amount of the 360-degree video is relatively increased as compared to existing image data, a transmission cost and a storage cost are increased if the image data is stored using an existing storage medium.

Therefore, a highly efficient image compression technique for effectively transmitting, storing, and reproducing information of 360-degree video is required.

SUMMARY OF THE INVENTION

The present invention provides a method and apparatus for enhancing efficiency of 360-degree video information transmission to provide a 360-degree video.

The present invention also provides an intra-prediction method and apparatus for performing intra-prediction on a projected picture regarding a 360-degree video.

The present invention also provides a method and apparatus for deriving a reference sample for intra-prediction of a target face of a projected picture from a reference face not adjacent to the target face on the projected picture.

The present invention also provides a method and apparatus for deriving a reference sample for intra-prediction of a target face of a projected picture from a reference face having a face index different from a face index of the target face.

In an aspect, an intra-prediction method performed by an encoding apparatus is provided. The method includes acquiring 360-degree video data captured by at least one camera, processing the 360-degree video data to acquire a projected picture, deriving a prediction mode of a target block in a target face of the projected picture, deriving reference samples, for the target block, in a reference face of the projected picture, deriving prediction samples of the target block based on the reference samples in the reference face, and generating 360-degree video information for the projected picture, encoding the generated 360-degree video information, and outputting the encoded information.

In another aspect, an encoding apparatus for performing intra-prediction is provided. The encoding apparatus includes a projection processing unit acquiring 360-degree video data captured by at least one camera and processing the 360-degree video data to acquire a projected picture, a predictor deriving a prediction mode of a target block in a target face of the projected picture, deriving reference samples for the target block in a reference face of the projected picture, and deriving predicted samples of the target block based on the reference samples in the reference face, and an entropy encoder generating 360-degree video information for the projected picture, encoding the generated 360-degree video information, and outputting the encoded information.

In another aspect, an intra-prediction method performed by a decoding apparatus is provided. The method includes receiving 360-degree video information, deriving a prediction mode of a target block in a target face in a projected picture based on the 360-degree video information, deriving reference samples, for the target block, in a reference face of the projected picture, and deriving predicted samples of the target block based on the reference samples in the reference face.

In another aspect, a decoding apparatus for processing 360-degree video data is provided. The decoding apparatus includes an entropy decoder receiving 360-degree video information and a predictor deriving a prediction mode of a target block in a target face of a projected picture based on the 360-degree video information, deriving reference samples for the target block from a reference face in the projected picture, and deriving predicted samples of the target block based on the reference samples in the reference face.

According to the present invention, in the decoding of a projected picture for 360-degree video, reference samples for intra-prediction of a target block in a target face may be derived from reference samples in a reference face having a face index different from that of the target face, thereby improving prediction accuracy for the target block.

According to the present invention, in the intra-prediction for a target block in a target face of a projected picture, prediction may be performed based on reference samples in a reference face adjacent to a target face on a three-dimensional spherical surface, thereby improving prediction accuracy and overall coding efficiency.

According to the present invention, a projected picture may be derived according to a projection type suitable for 360-degree video data among various projection types, thereby improving overall coding efficiency.

BRIEF DESCRIPTION OF THE DRAWINGS

FIG. 2 illustrates a process of processing a 360-degree video in an encoding apparatus and a decoding apparatus.

FIG. 5 illustrates projected pictures derived based on cube map projection (CMP).

FIG. 7 illustrates projected pictures derived based on icosahedral projection (ISP).

FIG. 9 illustrates projected pictures derived based on truncated square pyramid projection (TSP), segmented sphere projection (SSP), and equal region projection (EAP).

DESCRIPTION OF EMBODIMENTS

Figure 1:
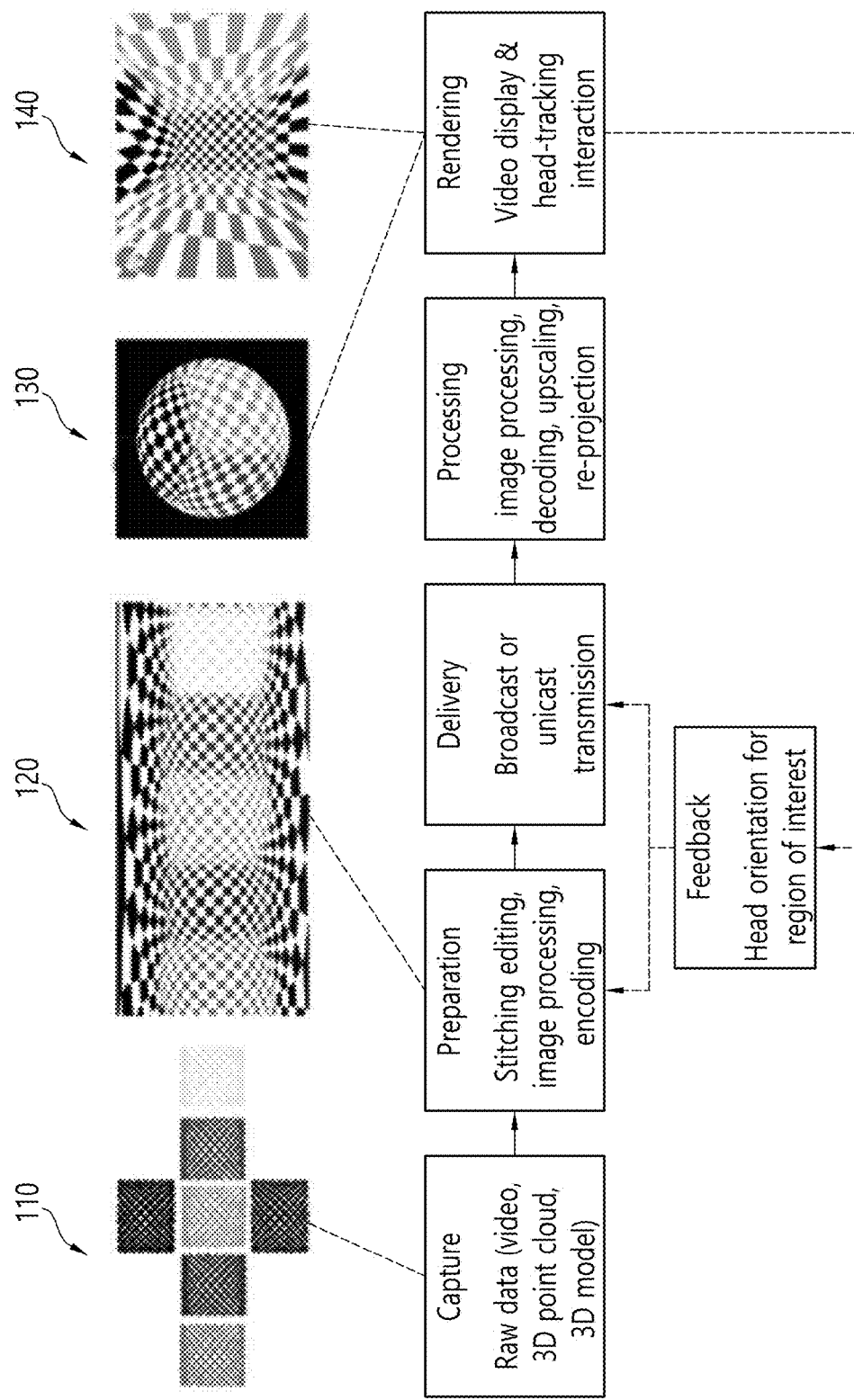
FIG. 1 is a view illustrating overall architecture for providing a 360-degree video according to the present invention.

The present disclosure may be modified in various forms, and specific embodiments thereof will be described and illustrated in the drawings. However, the embodiments are not intended for limiting the disclosure. The terms used in the following description are used to merely describe specific embodiments, but are not intended to limit the disclosure. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Meanwhile, elements in the drawings described in the disclosure are independently drawn for the purpose of convenience for explanation of different specific functions, and do not mean that the elements are embodied by independent hardware or independent software. For example, two or more elements of the elements may be combined to form a single element, or one element may be divided into plural elements. The embodiments in which the elements are combined and/or divided belong to the disclosure without departing from the concept of the disclosure.

Hereinafter, embodiments of the present disclosure will be described in detail with reference to the accompanying drawings. In addition, like reference numerals are used to indicate like elements throughout the drawings, and the same descriptions on the like elements will be omitted.

In the present specification, generally a picture means a unit representing an image at a specific time, a slice is a unit constituting a part of the picture. One picture may be composed of plural slices, and the terms of a picture and a slice may be mixed with each other as occasion demands.

A pixel or a pel may mean a minimum unit constituting one picture (or image). Further, a "sample" may be used as a term corresponding to a pixel. The sample may generally represent a pixel or a value of a pixel, may represent only a pixel (a pixel value) of a luma component, and may represent only a pixel (a pixel value) of a chroma component.

A unit indicates a basic unit of image processing. The unit may include at least one of a specific region and information related to the region. Optionally, the unit may be mixed with terms such as a block, a region, or the like. In a typical case, an M×N block may represent a set of samples or transform coefficients arranged in M columns and N rows.

FIG. 1 is a view illustrating overall architecture for providing a 360-degree video according to the present invention.

The present invention proposes a method of providing 360-content in order to provide virtual reality (VR) to users. VR may refer to technology for replicating actual or virtual environments or those environments. VR artificially provides sensory experience to users and thus users may experience electronically projected environments.

360-content refers to content for realizing and providing VR and may include a 360-degree video and/or 360-audio. The 360-degree video may refer to video or image content which is necessary to provide VR and is captured or reproduced omnidirectionally (360-degrees). Hereinafter, the 360-degree video may refer to 360-degree video. A 360-dgree video may refer to a video or an image represented on 3D spaces in various forms according to 3D models. For example, a 360-degree video may be represented on a spherical surface. The 360-audio is audio content for providing VR and may refer to spatial audio content whose audio generation source may be recognized to be located in a specific 3D space. 360-content may be generated, processed and transmitted to users and users may consume VR experiences using the 360-content.

Particularly, the present invention proposes a method for effectively providing a 360-degree video. To provide a 360-degree video, a 360-degree video may be captured through one or more cameras. The captured 360-degree video may be transmitted through series of processes and a reception side may process the received data into the original 360-degree video and render the 360-degree video. In this manner the 360-degree video may be provided to a user.

Specifically, processes for providing a 360-degree video may include a capture process, a preparation process, a transmission process, a processing process, a rendering process and/or a feedback process.

The capture process may refer to a process of capturing images or videos for a plurality of viewpoints through one or more cameras. Image/video data 110 illustrated in FIG. 1 may be generated through the capture process. Each plane of 110 in FIG. 1 may represent an image/video for each viewpoint. A plurality of captured images/videos may be referred to as raw data. Metadata related to capture may be generated during the capture process.

For capture, a special camera may be used. When a 360-degree video with respect to a virtual space generated by a computer is provided according to an embodiment, capture through an actual camera may not be performed. In this case, a process of simply generating related data may substitute for the capture process.

The preparation process may be a process of processing captured images/videos and metadata generated in the capture process. Captured images/videos may be subjected to a stitching process, a projection process, a region-wise packing process and/or an encoding process during the preparation process.

First, each image/video may be subjected to the stitching process. The stitching process may be a process of connecting captured images/videos to generate one panorama image/video or spherical image/video.

Subsequently, stitched images/videos may be subjected to the projection process. In the projection process, the stitched images/videos may be projected on 2D image. The 2D image may be called a 2D image frame or projected picture according to context. Projection on a 2D image may be referred to as mapping to a 2D image. Projected image/video data may have the form of a 2D image 120 in FIG. 1.

Also, in the projection process, a process of dividing the video data projected on the 2D image into regions and separately performing processing may be applied. Here, the regions may refer to divided regions of the 2D image in which 360-degree video data is projected. Each region may correspond to a face or a tile. According to an embodiment, these regions may equally or arbitrarily separate the 2D image. Also, according to an embodiment, the regions may be separated according to a projection scheme.

According to an embodiment, the processing process may include a process of rotating each region or reordering the regions on the 2D image to improve video coding efficiency. For example, by rotating the regions such that certain sides thereof are located close to each other, the coding efficiency may be increased.

According to an embodiment, this processing process may include raising or lowering resolution for a particular region to differentiate resolution of each region on a 360-degree video. For example, regions that are relatively more important in the 360-degree video may have a higher resolution than other regions. Video data projected on the 2D image may be subjected to an encoding process through a video codec.

According to an embodiment, the preparation process may further include an editing process or the like. In this editing process, editing of image/video data before and after projection may be further performed. Similarly, in the preparation process, metadata for stitching/projection/encoding/editing may be generated. Also, meta data regarding an initial time point of the video data projected on the 2D image, a ROI region of interest (ROI), and the like, may be generated.

The transmission process may be a process of processing the prepared image/video data and metadata and transmitting the processed image/video data and metadata. Processing according to a certain transmission protocol may be performed for transmission. The processed data for transmission may be transferred via a broadcast network and/or broadband. These data may be transferred to a receiving side on an on-demand basis. The receiving side may receive the corresponding data through various paths.

The processing process may be a process of decoding the received data and re-projecting the projected image/video data on a 3D model. In this process, the image/video data projected on the 2D images may be re-projected to a 3D space. This process may be called mapping, projection, depending on the context. Here, the mapped 3D space may have a different shape depending on the 3D model. For example, the 3D model may have a sphere, a cube, a cylinder, or a pyramid.

According to an embodiment of the present invention, the processing process may further include an editing process, an upscaling process, and the like. In the editing process, editing or the like may be further performed on the image/video data before and after re-projection. If the image/video data is scaled down, the image/video data may be enlarged by upscaling samples during upscaling. If necessary, an operation of reducing the size through downscaling may also be performed.

The rendering process may refer to a process of rendering and displaying re-projected image/video data on the 3D space. Depending on expression, the re-projection and the rendering may be combined and expressed as rendering on the 3D model. The image/video re-projected on the 3D model (or rendered on the 3D model) may have such a form as illustrated in 130 of in FIG. 1. 130 illustrated in FIG. 1 corresponds to an image/video re-projected to a spherical 3D model. A user may view some regions of the rendered image/video through a VR display or the like. In this case, the regions viewed by the user may be have such a form as 140 illustrated in FIG. 1.

The feedback process may be a process of transferring various types of feedback information that may be acquired in the display process to a transmitting side. Interactivity in 360-degree video consumption may be provided through the feedback process. According to an embodiment, head orientation information in the feedback process, viewport information indicating a region that the user is currently viewing, and the like, may be transmitted to the transmitting side. According to an embodiment, the user may interact with those implemented in a VR environment, in which case information associated with that interaction may be transferred to the transmitting side or a service provider side in the feedback process. According to an embodiment, the feedback process may not be performed.

The head orientation information may refer to information on a user's head position, angle, motion, and the like. Based on this information, information on a region that the user is currently viewing within the 360-degree video, i.e., the viewport information, may be calculated.

The viewport information may be information on the region that the user is currently is viewing in 360-degree video. This allows a gaze analysis to be performed to check how the user consumes the 360-degrees of video, which region of the 360-degree video the user is gaze at, and so on. The gaze analysis may be performed on the receiving side and transferred to the transmitting side via a feedback channel. A device such as a VR display or the like may extract a viewport region based on a user's head position/direction, vertical or horizontal field of view (FOV) information supported by the device, and the like.

According to an embodiment, the above-described feedback information is not only transmitted to the transmitting side but may also be consumed at the receiving side. That is, decoding, re-projection, and rendering processes on the receiving side may be performed using the above-described feedback information. For example, only the 360-degree video for the region that the user is currently viewing may be preferentially decoded and rendered using head orientation information and/or viewport information.

Here, the viewport or viewport region may refer to a region that the user is viewing in 360-degree video, which may be the dead point of the viewport region. That is, the viewport is a region centered on a viewpoint, and a size, a shape, or the like, occupied by the region may be determined by a field of view (FOV) (to be described later).

Image/video data to be subjected to a series of the processes of capture/projection/encoding/transmission/decoding/re-projection/rendering within an overall architecture for providing the above-described 360-degree video may be called 360-degree video data. The term of the 360-degree video may also be used to include metadata or signaling information associated with such image/video data.

FIG. 2 illustrates a process of processing a 360-degree video in an encoding apparatus and a decoding apparatus. (a)

of FIG. 2 may illustrate a process of processing of input 360-degree video data performed by an encoding apparatus. Referring to (a) of FIG. 2, a projection processing unit 210 may stitch and project 360-degree video data at an input time point to a 3D projection structure according to various projection schemes and represents the 360-degree video data projected to the 3D projection structure as a 2D image. That is the projection processing unit 210 may stitch the 360-degree video data and may project the 360-degree video data to the 2D image. Here, the projection scheme may be referred to as a projection type. The 2D image on which the 360-degree video data is projected may be referred to as a projected frame or a projected picture. The projected picture may be divided into a plurality of faces according to the projection type. Each face may correspond to a tile. The plurality of faces of the projected picture projected according to a specific projection type may have the same size and shape (e.g., triangle or square). In addition, the size and shape of the in-picture face projected according to the projection type may be different. The projection processing unit 210 may perform processing such as rotating and reordering the respective regions of the projected picture or changing resolution of the respective regions. The encoding apparatus 220 may encode information on the projected picture and output the encoded information through a bitstream. The process of encoding the projected picture by the encoding apparatus 220 will be described later in detail with reference to FIG. 3. Meanwhile, the projection processing unit 210 may be included in the encoding apparatus, or the projection process may be performed through an external apparatus.

(b) of FIG. 2 illustrates a process of processing information on a projected picture regarding 360-degree video data performed by a decoding apparatus. Information on the projected picture may be received through a bitstream.

The decoding apparatus 250 may decode the projection picture based on the information on the received projection picture. The process of decoding the projected picture by the decoding apparatus 250 will be described later in detail with reference to FIG. 4.

The re-projection processing unit 260 may re-project the 360-degree video data projected on the projected picture derived through the decoding process on the 3D model. The re-projection processing unit 260 may correspond to the projection processing unit. In this process, the 360-degree video data projected on the projected picture may be re-projected onto the 3D space. This process may also be called mapping, projection, depending on the context. Here, the mapped 3D space mapped may have a different shape depending on the 3D model. For example, the 3D model may have a sphere, a cube, a cylinder, or a pyramid. The re-projection processing unit 260 may be included in the decoding apparatus 250, or the re-projection process may be performed through an external device. The re-projected 360-degree video data may be rendered on the 3D space.

Figure 3:
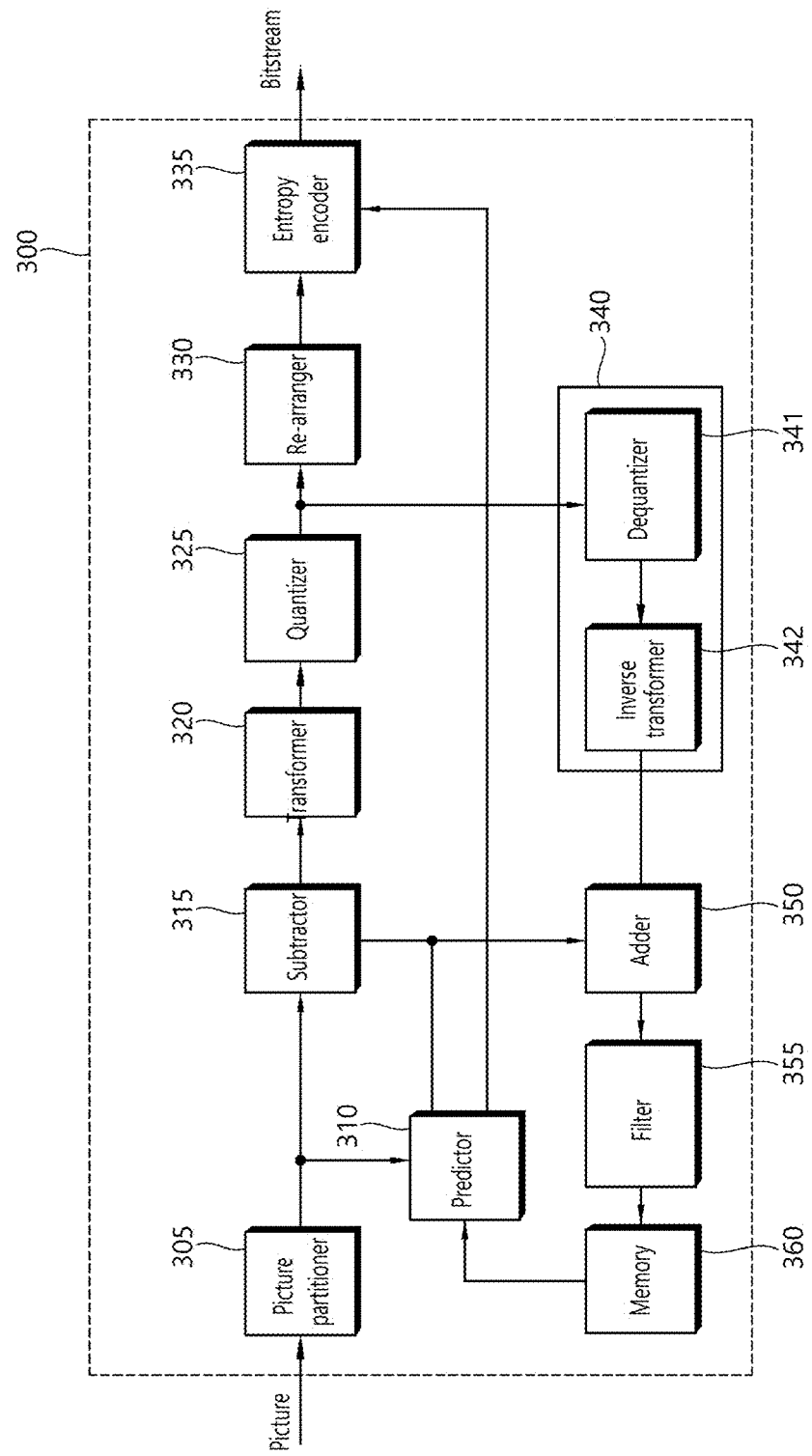
FIG. 3 is a schematic diagram illustrating a configuration of a video encoding apparatus to which the present disclosure is applicable.

FIG. 3 briefly illustrates a structure of a video encoding apparatus to which the present disclosure is applicable.

Referring to FIG. 3, a video encoding apparatus 300 may include a picture partitioner 305, a predicter 310, a subtractor 315, a transformer 320, a quantizer 325, a re-arranger 330, an entropy encoder 335, a residual processor 340, an adder 350, a filter 355, and a memory 360. The residual processor 340 may include a dequantizer 341 and an inverse transformer 342.

The picture partitioner 305 may split an input picture into at least one processing unit.

In one example, a processing unit may be called a coding unit (CU). In this case, starting with the largest coding unit (LCU), the coding unit may be recursively partitioned according to the QTBT (Quad-tree binary-tree) structure. For example, one coding unit may be divided into multiple coding units of a deeper depth based on a quad tree structure and/or a binary tree structure. In this case, for example, the quad tree structure may be applied first and the binary tree structure may be applied later. Alternatively, the binary tree structure may be applied first. The coding procedure according to the present disclosure may be performed based on the last coding unit which is not further divided. In this case, based on coding efficiency according to video characteristics, the largest coding unit may be used as the last coding unit. Alternatively, if necessary, the coding unit may be recursively divided into coding units of a further deeper depth so that the coding unit of the optimal size may be used as the last coding unit. In this connection, the coding procedure may include procedures such as prediction, transform, and reconstruction, which will be described later.

As another example, a processing unit may include a coding unit (CU), a prediction unit (PU) or a transform unit (TU). The coding unit is one of coding units of deeper depth split from a largest coding unit (LCU) according to a quad-tree structure. In this case, the largest coding unit may be used as a final coding unit or a coding unit may be recursively split into coding units of deeper depth as necessary and a coding unit having an optimal size may be used as a final coding unit based on coding efficiency according to video characteristics. When a smallest coding unit (SCU) is set, a coding unit cannot be split into a coding unit smaller than the smallest coding unit. Here, the final coding unit refers to a coding unit partitioned or split into a predictor or a transformer. A prediction unit is a unit partitioned from a coding unit block and may be a unit of sample prediction. Here, the prediction unit may be divided into sub blocks. A transform unit may be split from a coding unit according to the quad-tree structure and may be a unit that derives a transform coefficient and/or a unit that derives a residual signal from a transform coefficient. Hereinafter, the coding unit may be called a coding block (CB), the prediction unit may be called a predicted block (PB), and the transform unit may be called a transform block (TB). The predicted block or the prediction unit may mean a specific region having a block shape in a picture, and may include an array of a predicted sample. Further, the transform block or the transform unit may mean a specific region having a block shape in a picture, and may include a transform coefficient or an array of a residual sample.

The predicter 310 may perform prediction on a processing target block (hereinafter, a current block), and may generate a predicted block including predicted samples for the current block. A unit of prediction performed in the predicter 310 may be a coding block, or may be a transform block, or may be a predicted block.

The predicter 310 may determine whether intra-prediction is applied or inter-prediction is applied to the current block. For example, the predicter 310 may determine whether the intra-prediction or the inter-prediction is applied in unit of CU.

In case of the intra-prediction, the predicter 310 may derive a predicted sample for the current block based on a reference sample outside the current block in a picture to which the current block belongs (hereinafter, a current picture). In this case, the predicter 310 may derive the predicted sample based on an average or interpolation of neighboring reference samples of the current block (case (i)), or may derive the predicted sample based on a reference sample existing in a specific (prediction) direction as to a predicted sample among the neighboring reference samples of the current block (case (ii)). The case (i) may be called a non-directional mode or a non-angular mode, and the case (ii) may be called a directional mode or an angular mode. In the intra-prediction, prediction modes may include as an example 33 directional modes and at least two non-directional modes. The non-directional modes may include DC mode and planar mode. The predictor 310 may determine the prediction mode to be applied to the current block by using the prediction mode applied to the neighboring block.

In case of the inter-prediction, the predictor 310 may derive the predicted sample for the current block based on a sample specified by a motion vector on a reference picture. The predictor 310 may derive the predicted sample for the current block by applying any one of a skip mode, a merge mode, and a motion vector prediction (MVP) mode. In case of the skip mode and the merge mode, the predictor 310 may use motion information of the neighboring block as motion information of the current block. In case of the skip mode, unlike in the merge mode, a difference (residual) between the predicted sample and an original sample is not transmitted. In case of the MVP mode, a motion vector of the neighboring block is used as a motion vector predictor and thus is used as a motion vector predictor of the current block to derive a motion vector of the current block.

In case of the inter-prediction, the neighboring block may include a spatial neighboring block existing in the current picture and a temporal neighboring block existing in the reference picture. The reference picture including the temporal neighboring block may also be called a collocated picture (colPic). Motion information may include the motion vector and a reference picture index. Information such as prediction mode information and motion information may be (entropy) encoded, and then output as a form of a bitstream.

When motion information of a temporal neighboring block is used in the skip mode and the merge mode, a highest picture in a reference picture list may be used as a reference picture. Reference pictures included in the reference picture list may be aligned based on a picture order count (POC) difference between a current picture and a corresponding reference picture. A POC corresponds to a display order and may be discriminated from a coding order.

The subtractor 315 generates a residual sample which is a difference between an original sample and a predicted sample. If the skip mode is applied, the residual sample may not be generated as described above.

The transformer 320 transforms residual samples in units of a transform block to generate a transform coefficient. The transformer 320 may perform transformation based on the size of a corresponding transform block and a prediction mode applied to a coding block or predicted block spatially overlapping with the transform block. For example, residual samples may be transformed using discrete sine transform (DST) if intra-prediction is applied to the coding block or the predicted block overlapping with the transform block and the transform block is a 4×4 residual array and is transformed using discrete cosine transform (DCT) in other cases.

The quantizer 325 may quantize the transform coefficients to generate a quantized transform coefficient.

The re-arranger 330 rearranges quantized transform coefficients. The re-arranger 330 may rearrange the quantized transform coefficients in the form of a block into a one-dimensional vector through a coefficient scanning method. Although the re-arranger 330 is described as a separate component, the re-arranger 330 may be a part of the quantizer 325.

The entropy encoder 335 may perform entropy-encoding on the quantized transform coefficients. The entropy encoding may include an encoding method, for example, an exponential Golomb, a context-adaptive variable length coding (CAVLC), a context-adaptive binary arithmetic coding (CABAC), or the like. The entropy encoder 335 may perform encoding together or separately on information (e.g., a syntax element value or the like) required for video reconstruction in addition to the quantized transform coefficients. The entropy-encoded information may be transmitted or stored in unit of a network abstraction layer (NAL) in a bitstream form.

The dequantizer 341 dequantizes values (transform coefficients) quantized by the quantizer 325 and the inverse transformer 142 inversely transforms values dequantized by the dequantizer 341 to generate a residual sample.

The adder 350 adds a residual sample to a predicted sample to reconstruct a picture. The residual sample may be added to the predicted sample in units of a block to generate a reconstructed block. Although the adder 350 is described as a separate component, the adder 350 may be a part of the predictor 310. The adder 350 may be referred to as a reconstruction unit or reconstructed block generator.

The filter 355 may apply deblocking filtering and/or a sample adaptive offset to the reconstructed picture. Artifacts at a block boundary in the reconstructed picture or distortion in quantization may be corrected through deblocking filtering and/or sample adaptive offset. Sample adaptive offset may be applied in units of a sample after deblocking filtering is completed. The filter 355 may apply an adaptive loop filter (ALF) to the reconstructed picture. The ALF may be applied to the reconstructed picture to which deblocking filtering and/or sample adaptive offset has been applied.

The memory 360 may store a reconstructed picture (decoded picture) or information necessary for encoding/decoding. Here, the reconstructed picture may be the reconstructed picture filtered by the filter 355. The stored reconstructed picture may be used as a reference picture for (inter) prediction of other pictures. For example, the memory 360 may store (reference) pictures used for inter-prediction. Here, pictures used for inter-prediction may be designated according to a reference picture set or a reference picture list.

Figure 4:
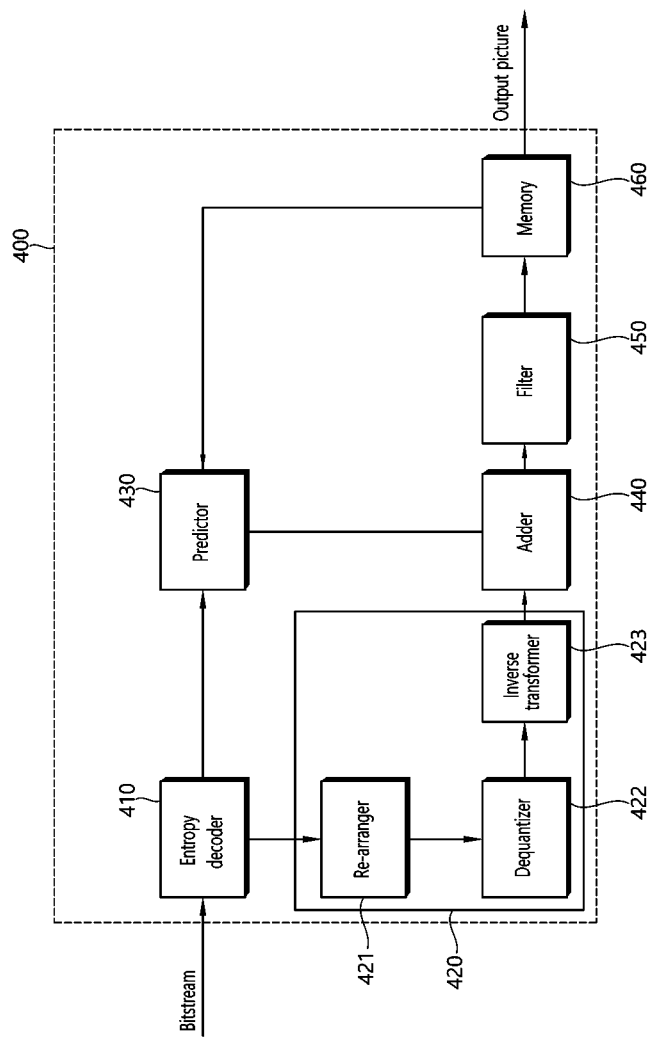
FIG. 4 is a schematic diagram illustrating a configuration of a video decoding apparatus to which the present disclosure is applicable.

FIG. 4 briefly illustrates a structure of a video decoding apparatus to which the present disclosure is applicable.

Referring to FIG. 4, a video decoding apparatus 400 may include an entropy decoder 410, a residual processor 420, a predictor 430, an adder 440, a filter 450 and a memory 460. The residual processor may include a re-arranger 421, a dequantizer 422, and an inverse transformer 423.

When a bitstream including video information is input, the video decoding apparatus 400 may reconstruct a video in association with a process by which video information is processed in the video encoding apparatus.

For example, the video decoding apparatus 400 may perform video decoding by using a processing unit applied in the video encoding apparatus. Therefore, as an example, the processing unit block of video decoding may be a coding unit, or as another example, the processing unit block of video decoding may be a coding unit, a prediction unit, or a transform unit. The coding unit may be split according to a quad tree structure or binary tree structure from a largest coding unit block.

A prediction unit or a transform unit may be used, here the prediction unit block is a block derived or partitioned from the coding unit, the prediction unit may be a unit block of sample prediction. In this case, the prediction unit may be divided into sub blocks. The transform unit may be split according to the quad tree structure, and may be a unit for deriving a transform coefficient or a unit for deriving a residual signal from the transform coefficient.

The entropy decoder 410 may parse the bitstream to output information required for video reconstruction or picture reconstruction. For example, the entropy decoder 410 may decode information in the bitstream based on a coding method such as exponential Golomb encoding, CAVLC, CABAC, or the like, and may output a value of a syntax element required for video reconstruction and a quantized value of a transform coefficient regarding a residual.

More specifically, a CABAC entropy decoding method may receive a bin corresponding to each syntax element in a bitstream, determine a context model using decoding target syntax element information and decoding information of neighboring and decoding target blocks or information of symbol/bin decoded in a previous step, predict bin generation probability according to the determined context model and perform arithmetic decoding of the bin to generate a symbol corresponding to each syntax element value. Here, the CABAC entropy decoding method may update the context model using information of a symbol/bin decoded for a context model of the next symbol/bin after determination of the context model.

Information on prediction among information decoded in the entropy decoder 410 may be provided to the predictor 450 and residual values, that is, quantized transform coefficients, on which entropy decoding has been performed by the entropy decoder 410 may be input to the re-arranger 421.

The re-arranger 421 may rearrange the quantized transform coefficients into a two-dimensional block form. The re-arranger 421 may perform rearrangement corresponding to coefficient scanning performed by the encoding apparatus. Although the re-arranger 421 is described as a separate component, the re-arranger 421 may be a part of the dequantizer 422.

The dequantizer 422 may de-quantize the quantized transform coefficients based on a (de)quantization parameter to output a transform coefficient. In this case, information for deriving a quantization parameter may be signaled from the encoding apparatus.

The inverse transformer 423 may inverse-transform the transform coefficients to derive residual samples.

The predictor 430 may perform prediction on a current block, and may generate a predicted block including predicted samples for the current block. A unit of prediction performed in the predictor 430 may be a coding block or may be a transform block or may be a predicted block.

The predictor 430 may determine whether to apply intra-prediction or inter-prediction based on information on a prediction. In this case, a unit for determining which one will be used between the intra-prediction and the inter-prediction may be different from a unit for generating a predicted sample. In addition, a unit for generating the predicted sample may also be different in the inter-prediction and the intra-prediction. For example, which one will be applied between the inter-prediction and the intra-prediction may be determined in unit of CU. Further, for example, in the inter-prediction, the predicted sample may be generated by determining the prediction mode in unit of PU, and in the intra-prediction, the predicted sample may be generated in unit of TU by determining the prediction mode in unit of PU.

In case of the intra-prediction, the predictor 430 may derive a predicted sample for a current block based on a neighboring reference sample in a current picture. The predictor 430 may derive the predicted sample for the current block by applying a directional mode or a non-directional mode based on the neighboring reference sample of the current block. In this case, a prediction mode to be applied to the current block may be determined by using an intra-prediction mode of a neighboring block.

In the case of inter-prediction, the predictor 450 may derive a predicted sample for a current block based on a sample specified in a reference picture according to a motion vector. The predictor 430 may derive the predicted sample for the current block using one of the skip mode, the merge mode and the MVP mode. Here, motion information required for inter-prediction of the current block provided by the video encoding apparatus, for example, a motion vector and information on a reference picture index may be acquired or derived based on the information on prediction.

In the skip mode and the merge mode, motion information of a neighboring block may be used as motion information of the current block. Here, the neighboring block may include a spatial neighboring block and a temporal neighboring block.

The predictor 430 may construct a merge candidate list using motion information of available neighboring blocks and use information indicated by a merge index on the merge candidate list as a motion vector of the current block. The merge index may be signaled by the encoding apparatus. Motion information may include a motion vector and a reference picture. When motion information of a temporal neighboring block is used in the skip mode and the merge mode, a highest picture in a reference picture list may be used as a reference picture.

In the case of the skip mode, a difference (residual) between a predicted sample and an original sample is not transmitted, distinguished from the merge mode.

In the case of the MVP mode, the motion vector of the current block may be derived using a motion vector of a neighboring block as a motion vector predictor. Here, the neighboring block may include a spatial neighboring block and a temporal neighboring block.

When the merge mode is applied, for example, a merge candidate list may be generated using a motion vector of a reconstructed spatial neighboring block and/or a motion vector corresponding to a temporal neighboring block. A motion vector of a candidate block selected from the merge candidate list is used as the motion vector of the current block in the merge mode. The aforementioned information on prediction may include a merge index indicating a candidate block having the best motion vector selected from candidate blocks included in the merge candidate list. Here, the predictor 450 may derive the motion vector of the current block using the merge index.

When the MVP (Motion Vector Prediction) mode is applied as another example, a motion vector predictor candidate list may be generated using a motion vector of a reconstructed spatial neighboring block and/or a motion vector corresponding to which is a temporal neighboring block. That is, the motion vector of the reconstructed spatial neighboring block and/or the motion vector corresponding to the temporal neighboring block may be used as motion vector candidates. The aforementioned information on prediction may include a prediction motion vector index indicating the best motion vector selected from motion vector candidates included in the list. Here, the predictor 430 may select a prediction motion vector of the current block from the motion vector candidates included in the motion vector candidate list using the motion vector index. The predictor of the encoding apparatus may acquire a motion vector difference (MVD) between the motion vector of the current block and a motion vector predictor, encode the MVD and output the encoded MVD in the form of a bitstream. That is, the MVD may be acquired by subtracting the motion vector predictor from the motion vector of the current block. Here, the predictor 430 may acquire a motion vector included in the information on prediction and derive the motion vector of the current block by adding the motion vector difference to the motion vector predictor. In addition, the predictor may acquire or derive a reference picture index indicating a reference picture from the aforementioned information on prediction.

The adder 440 may add a residual sample to a predicted sample to reconstruct a current block or a current picture. The adder 440 may reconstruct the current picture by adding the residual sample to the predicted sample in units of a block. When the skip mode is applied, a residual is not transmitted and thus the predicted sample may become a reconstructed sample. Although the adder 440 is described as a separate component, the adder 440 may be a part of the predictor 430. The adder 440 may be referred to as a reconstruction unit or reconstructed block generator.

The filter 450 may apply deblocking filtering, sample adaptive offset and/or ALF to the reconstructed picture. Here, sample adaptive offset may be applied in units of a sample after deblocking filtering. The ALF may be applied after deblocking filtering and/or application of sample adaptive offset.

The memory 460 may store a reconstructed picture or information necessary for decoding. Here, the reconstructed picture may be the reconstructed picture filtered by the filter 450. For example, the memory 460 may store pictures used for inter-prediction. Here, the pictures used for inter-prediction may be designated according to a reference picture set or a reference picture list. A reconstructed picture may be used as a reference picture for other pictures. The memory 460 may output reconstructed pictures in an output order.

Meanwhile, as described above, the 360-degree video data represented on a spherical surface may be projected onto the 2D image, and here, the 2D image on which the 360-degree video data is projected may be called a projected frame or a projected picture. In addition, the projected picture may be divided into a plurality of faces according to the projection type. The face may correspond to a tile, or the face may be defined separately from the tile. The projected picture may include several types of faces or one face according to various projection types. Also, the successive 360-degree video data in the 3D space may be mapped to faces not adjacent on the projected picture. That is, when intra-prediction is performed on a target block, prediction may be performed by deriving the samples included in the faces not adjacent on the projected picture to enhance prediction accuracy and coding efficiency. Thus, the present invention proposes an intra-prediction method performed in consideration of 360-degree video data mapped to various projection types and non-adjacent faces.

FIG. 5 illustrates a projected picture derived based on a cube map projection (CMP). The CMP may also be referred to as a cubic projection scheme. Referring to FIG. 5, the 360-degree video data may be projected onto a 2D image (or frame) according to a cubic projection scheme. For example, the stitched 360-degree video data may be represented on a spherical surface and may be divided into a cubic 3D projection structure and projected onto the 2D image. That is, the 360-degree video data on the spherical surface may be mapped to each of the six faces of the cube, and as illustrated in (a) to (f) of FIG. 5, each face of the cube may be mapped to the 2D image. The six faces may include a front face, a back face, a top face, a bottom face, a right face, and a left face.

The faces of the projected picture may be packed into a 4×3 cube map, i.e., four columns and three rows, as illustrated in (a) of FIG. 5. A sample of a region in which the 360-degree video data is not mapped as illustrated in (a) of FIG. 5 may be represented as an invalid sample. In addition, the faces may be packed into a 3×4 cube map, i.e., three columns and four rows, as illustrated in (b) of FIG. 5.

Furthermore, as illustrated in (c) of FIG. 5, the faces may also be packed into a 3×2 cube map, i.e., three columns and two rows. In this case, the projected picture may not include an invalid sample. Also, the faces may be packed into a 2×3 cube map, i.e., two rows and three rows, as illustrated in (d) of FIG. 5.

In addition, the faces may be packed into a 6×1 cube map, i.e., six rows and one row, as illustrated in (e) of FIG. 5. In addition, the faces may be packed into a 1×6 cube map, i.e., one column and six rows, as illustrated in (f) of FIG. 5.

Also, the 360-degree video data may be projected and/or packed to a picture through equirectangular projection (ERP), icosahedral projection (ISP), octahedron projection (OHP), truncated square pyramid projection (TSP), segmented sphere projection (SSP) and equal region projection (EAP).

Figure 6:
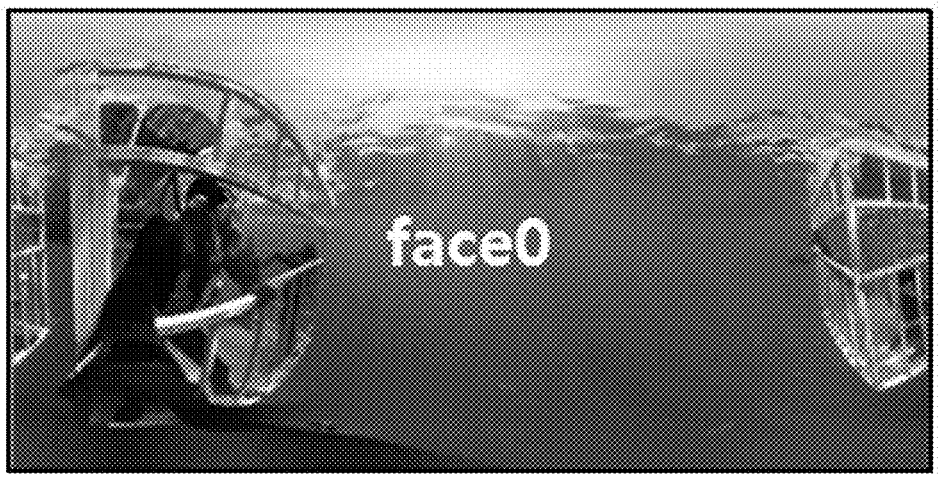
FIG. 6 illustrates a projected picture derived based on equirectangular projection (ERP).

FIG. 6 illustrates a projected picture derived based on the ERP. When 360-degree video data is projected through the ERP, for example, stitched 360-degree video data may be represented on a spherical surface, and the 360-degree video data may be projected as a single picture held in continuity on the spherical surface. Thus, as illustrated in FIG. 6, the 360-degree video data may be mapped to one face in the projected picture.

FIG. 7 illustrates a projected picture derived based on the ISP. When 360-degree video data is projected through the ISP, for example, the stitched 360-degree video data may be represented on a spherical surface, and the 360-degree video data may be divided into an icosahedral 3D projection structure so as to be projected on a 2D image. That is, the 360-degree video data on the spherical surface may be projected onto the 2D image as illustrated in (a) to (c) of FIG. 7.

Referring to (a) of FIG. 7, the 360-degree video data may be mapped to faces including an invalid sample and faced not including an invalid sample. The right triangular regions of the half of the faces including the invalid sample may include invalid samples and the other half of the right triangular regions may include the 360-degree video mapped samples.

Also, referring to (b) of FIG. 7, the 360-degree video data may be mapped only to faces not including an invalid sample. Also, referring to (c) of FIG. 7, the 360-degree video data may be mapped only to faces including the invalid sample. The right triangular regions of the half of the faces including the invalid sample may include invalid samples and the other half of the right triangular regions may include the 360-degree video-mapped samples.

Figure 8:
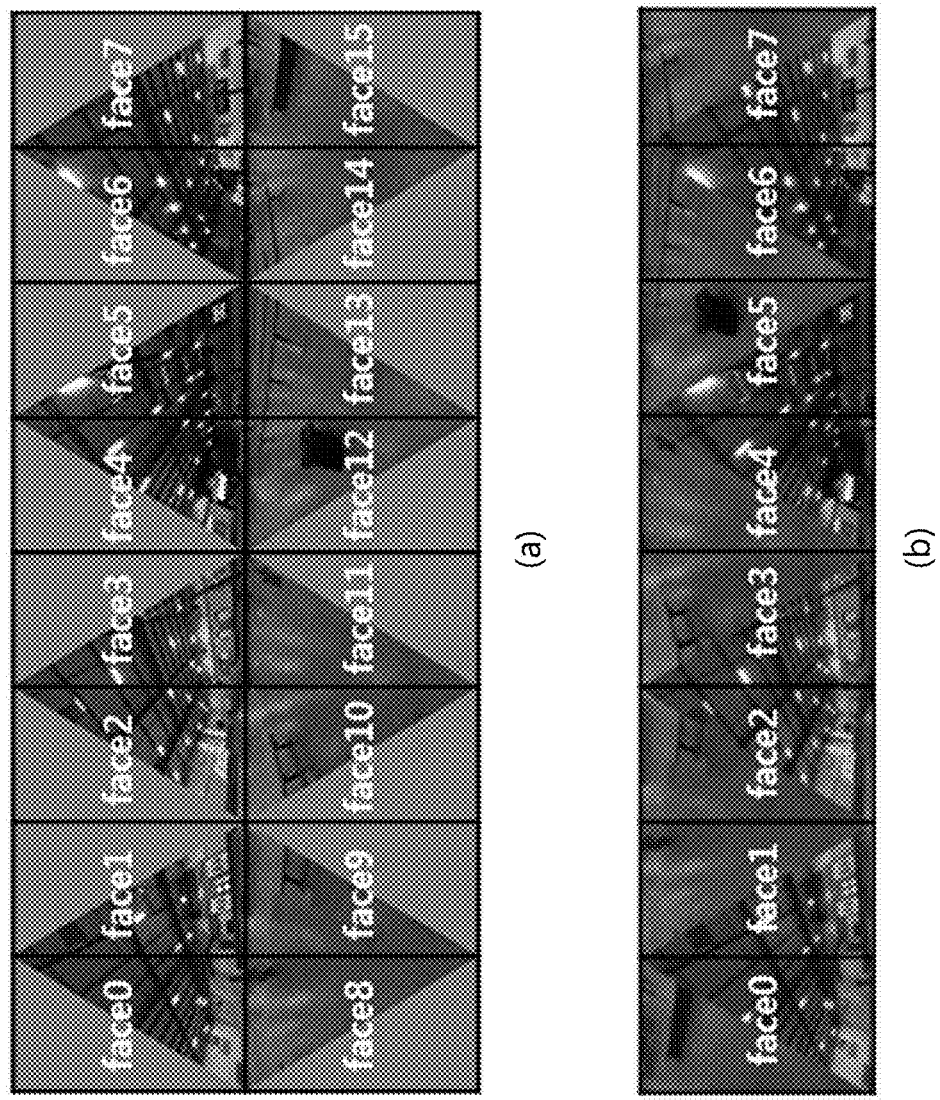
FIG. 8 illustrates projected pictures derived based on octahedron projection (OHP).

FIG. 8 illustrates a projected picture derived based on the OHP. When 360-degree video data is projected through the ISP, for example, the stitched 360-degree video data may be represented on a spherical surface and the 360-degree video data may be divided into an octahedral 3D projection structure so as to be projected on a 2D image. That is, the 360-degree video data on the spherical surface may be projected onto the 2D image as illustrated in (a) and (b) of FIG. 8.

Referring to (a) of FIG. 8, the 360-degree video data may be mapped to faces including an invalid sample and faces not including the invalid sample. The right triangular regions of the half of the faces including the invalid sample may include invalid samples and the other half of the right triangular regions may include the 360-degree video mapped samples. Also, referring to (b) of FIG. 8, the 360-degree video data may be mapped only to faces not including an invalid sample.

FIG. 9 illustrates a projected picture derived based on the TSP, SSP, or EAP.

Referring to (a) of FIG. 9, the 360-degree video data may be projected onto a picture through the TSP. For example, the stitched 360-degree video data may be represented on a spherical surface, and the 360-degree video data may be divided into a 3D projection structure in the form of a truncated square pyramid so as to be projected on the 2D image. Here, the truncated square pyramid shape may be a pyramid shape in which a square top surface smaller than a bottom surface exists. In addition, when the 360-degree video data is projected through the TSP, the 360-degree video data may be projected as one picture held in continuity on the spherical surface. Therefore, the 360-degree video data on the spherical surface may be projected to one face as illustrated in (a) of FIG. 9.

Referring to (b) of FIG. 9, the 360-degree video data may be projected onto a frame through the SSP. The 360-degree video data may be mapped to six faces in a frame, and the faces may be packed into six columns and one row as illustrated in (b) of FIG. 9.

Referring to (c) of FIG. 9, the 360-degree video data may be projected onto a frame through the EAP. The 360-degree video data may be projected into one picture held in continuity on the spherical surface. Therefore, the 360-degree video data on the spherical surface may be projected to one face as illustrated in (c) of FIG. 9.

Meanwhile, a face structure for dividing the picture (the above-mentioned projected picture) to which the 360-degree video data is mapped into a plurality of faces may indicate a reference face of a prediction target face to thereby improve continuity and become more suitable for prediction. The reference face may have a face index different from a face index of the target face or may not be adjacent to the reference face. That is, prediction may be performed through the reference face including video data which is continued with the 360-degree video data included in the prediction target face.

For example, the top row samples of face 4 illustrated in (a) of FIG. 5 may be samples including neighboring samples of left row samples of face 1, that is, successive video data. In this case, when the top row samples of the face 4 is encoded, the left column samples of the face 1 may be used as reference samples of prediction of the top row samples of the face 4. The information on the face may be signaled on a picture parameter set (PPS) basis. The information on the face may be transmitted in units of CU, CTU, slice, or sequence parameter set (SPS).

The syntax including information on the face may be as illustrated in the following table.

TABLE 1

| pic_parameter_set_rbsp( ) { | Descriptor |
|---|---|
| ... | |
| face_enabled_flag | u(1) |
| if( face_enabled_flag ) | |
| face( ) | |
| ... | |
| } | |

Here, face_enabled_flag may represent a syntax element indicating a face availability flag, and face ( ) may represent a syntax element indicating information on the face. The face availability flag may indicate availability of the face structure. That is, the face availability flag may indicate whether the projected picture includes a plurality of faces. For example, when a value of the face availability flag is 0, it may indicate that the face structure is not used in the projected picture, and when the value of the face availability flag is 1, it may indicate that the face structure is used in the projected picture.

If the value of the face availability flag is 1, that is, if it indicates that the face structure is used in the projected picture, information on a face of the projected picture may be signaled. The information on the face may include specific detailed information on the face as follows. A syntax including the detailed information of the face may be as illustrated in the following table.

TABLE 2

| face ( ) { | Descriptor |
|---|---|
| face_width | |
| face_height | |
| face_row | |
| face_col | |
| face_invalid_flag | |
| face_rotation | |
| face_gp | |
| neighbor face ( ) | |
| } | |

Here, face_width may represent a syntax element indicating a width of the face, face_height may represent a syntax element indicating a height of the face, face_row may represent a syntax element indicating the number of faces in each row in which the faces of the projected picture are arranged, and face_col may represent a syntax element indicating the number of faces in each column in which the faces of the projected picture are arranged. In addition, face_invalid_flag may represent a syntax element of a face-invalid flag indicating whether the face is invalid, i.e., whether it includes only invalid samples. For example, if the value of the face-invalid flag is 1, the face may not be valid, that is, it may include only the invalid samples. In addition, if the value of the face-invalid flag is 0, the face may include a sample to which the 360-degree video data is mapped. Further, face_rotation may represent a syntax element indicating whether or not the face is rotated or not. For example, if the face_rotation value is 0, the face_rotation may indicate that the face has not been rotated, and if the face_rotation has a value of 1, the face_rotation may indicate that the face has been rotated 90 degrees in a clockwise direction, if the face_rotation has a value of 2, the face_rotation may indicate that the face has been rotated 180 degrees in the clockwise direction, and if the face_rotation has a value of 3, the face_rotation may indicate that the face has been rotated 270 degrees in the clockwise direction. Further, face_qp may represent a syntax element indicating a quantization parameter (QP) value of the face, and neighbour_face may represent a syntax element of information indicating a reference face of the face. That is, the neighbour_face may represent a syntax element of information indicating a reference face of the face.

Meanwhile, the faces onto which the 360-degree video data in the projected picture is projected may include a plurality of coding units (CUs) and may be encoded/decoded in units of CUs. That is, intra-prediction or inter-prediction may be performed in units of CUs. Specifically, when intra-prediction is applied to a target CU, a predicted sample for the target CU may be derived based on the neighboring reference samples in the picture (or frame). In the intra-prediction, an intra-prediction mode may have, for example, 33 directional prediction modes and at least two non-directional modes. The non-directional mode may include a DC prediction mode and a planar mode. The directional mode or the non-directional mode may be applied to the target CU, and a predicted sample for the target CU may be derived based on the reference sample of the target CU. Here, a prediction mode to be applied to the target CU may be determined using the intra-prediction mode of the neighboring CU.

Further, the CUs in the projected picture may be encoded/decoded according to specific processing order. The specific processing or may be z-scan order. That is, the CUs are encoded/decoded sequentially in order from an upper row to a lower row, and the CUs may be sequentially encoded/decoded in order from a left CU to a right CU in each row. Accordingly, when intra-prediction is applied to the target CU, upper neighboring samples, upper right neighboring samples, and left neighboring samples reconstructed at the time of a decoding process of the target CU in terms of decoding order may be used as reference samples of the current block. Thus, in the case of the CUs adjacent to a left end boundary or an upper boundary of the face, among the CUs in the face, positions of the reference samples may not be included in the range of the face. In this case, reference samples for intra-prediction of the CUs may be derived as follows.

Figure 10:
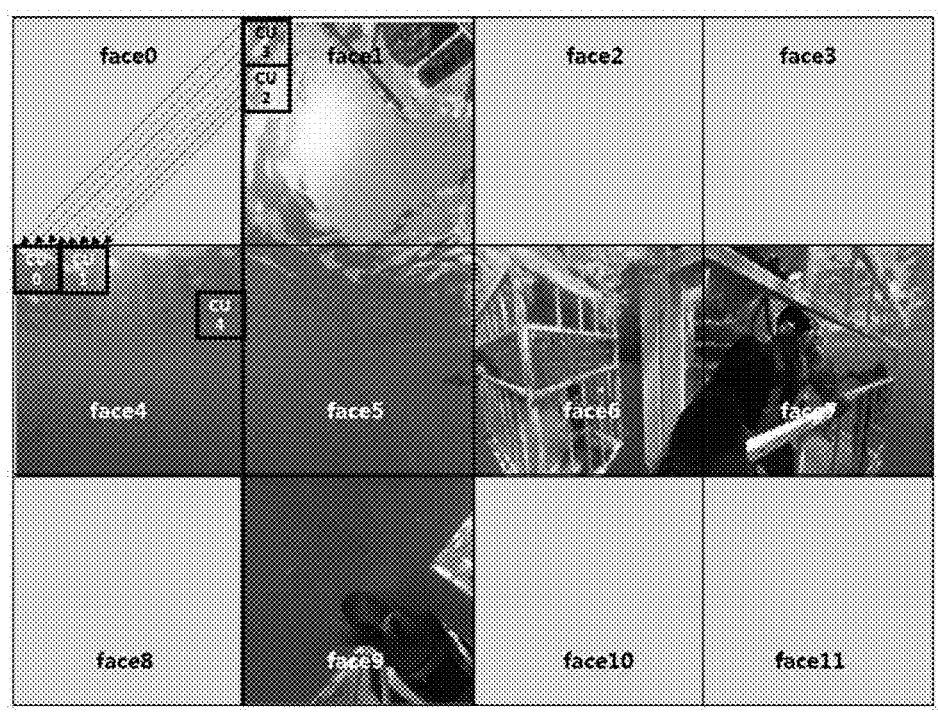
FIG. 10 illustrates a method of deriving a reference sample for intra-prediction of a CU in a target face.

FIG. 10 illustrates a method of deriving a reference sample for intra-prediction of a CU in a target face. If intra-prediction is applied to the target CU, reference samples for intra-prediction of the target CU may be needed. Meanwhile, a neighboring sample of the target CU may be an invalid sample not including 360-degree video data, in which case a reference sample replacing the invalid sample may be derived. For example, a region where the 360-degree video data of FIG. 10 is not mapped, for example, face 0 may include invalid samples that do not include the 360-degree video data, in which case upper neighboring samples of CU0 or CU1 in the face 4 are invalid samples, and thus, the upper neighboring samples cannot be used as reference samples of intra-prediction. Therefore, reference samples for intra-prediction of the CU0 or CU1 may be derived through the following method.

For example, among the neighboring CUs already reconstructed at the decoding time of the target CU, a neighboring CU having the same face index as that of the target CU may be present. That is, there may be a neighboring CU included in the same face as the target CU among the neighboring CUs already reconstructed at the decoding time of the target CU. In this case, the reference samples of the target CU may be derived from the neighboring CUs having the same face index. For example, in the case of the CU1, CU0 may exist as a neighboring CU included in the same face as the CU1 among the neighboring CUs already reconstructed at the decoding time of the CU1, and the reconstructed sample of the CU0 may be derived as a reference sample of the CU1.

Alternatively, the reference sample of the target CU may be derived from a CU included in a face which is not the same as the face in which the target CU is included but which has the same boundary. The face which is not the same as the face including the target CU may be referred to as a reference face. For example, an upper sample of CU1 and a left sample of CU2 included in the face 1 include successive 360-degree video data, and thus, the left reconstructed samples of the CU2 may be derived as upper reference samples of CU1. When the reference sample of the target CU is derived from the reference face CU of the face including the target CU, the reference face may be derived based on the neighbour_face syntax element described above.

The reference sample of the target CU may be derived through the method of deriving the reference sample of the target CU from a neighboring CU having the same face index as the face index of the target CU or the method of deriving the reference sample of the target CU from the CU in the reference face of the face including the target CU as described above, or alternatively, the reference sample of the target CU may be derived through a combination of the above-described methods.

As another example, a reconstructed neighboring CU having the same face index as the face index of the target CU may not be present at the decoding time of the target CU. That is, there may be no reconstructed neighboring CU included in the same face as the target CU at the decoding time of the target CU. For example, according to the z-scan order, the CU0 in the face 4 may be decoded first among the CUs in the face 4, and therefore, there may be no neighboring CU included in the same face as the target CU among the CUs already reconstructed at the decoding time of the CU0.

In this case, a prediction method other than intra-prediction may be performed on the target CU. For example, inter-prediction instead of intra-prediction may be performed on the CU0.

Alternatively, the reference sample of the target CU may be derived from a face that is not the same as the face including the target CU, i.e., a CU included in the reference face but having the same boundary. For example, an upper sample of CU0 and a left sample of CU3 included in face 1 include successive 360-degree video data, and thus, the left reconstructed samples of CU3 may be derived as upper reference samples of CU0. When the reference sample of the target CU is derived from the CU in the reference face of the face including the target CU, the reference face may be derived based on the neighbour_face syntax element described above.

Alternatively, the intra-prediction mode of the target CU may be derived in the DC mode or the planar mode. For example, the intra-prediction mode of the CU0 may be derived in the DC mode or the planar mode, and prediction of the CU0 may be performed based on the DC mode or the planar mode.

Figure 11:
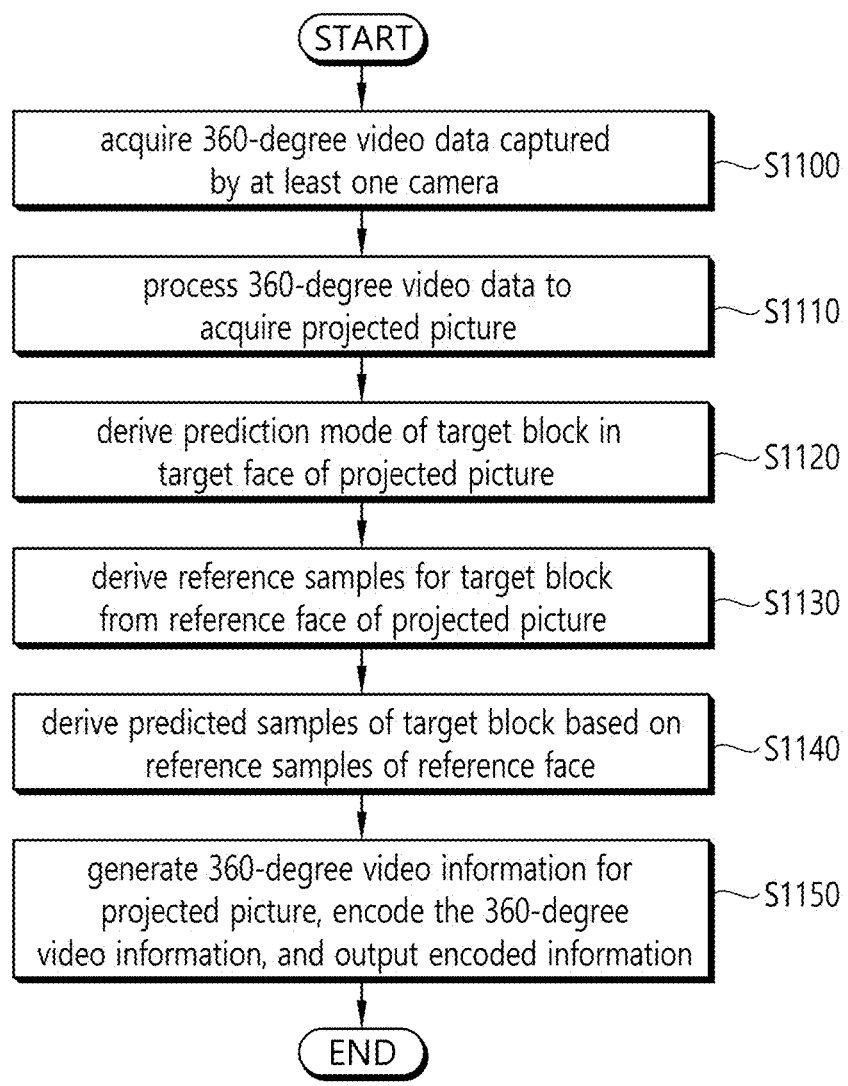
FIG. 11 schematically illustrates an intra-prediction method by an encoding apparatus according to the present invention.

FIG. 11 schematically illustrates an intra-prediction method by an encoding apparatus according to the present invention. The method disclosed in FIG. 11 may be performed by the encoding apparatus disclosed in FIG. 3. Specifically, for example, S1100 to S1110 in FIG. 11 may be performed by the projection processing unit of the encoding apparatus, S1120 to S1140 may be performed by the predictor of the encoding apparatus, and S1150 may be performed by the entropy-encoder of the encoding apparatus.

The encoding apparatus acquires 360-degree video data captured by at least one camera (S1100). The encoding apparatus may acquire 360-degree video data captured by at least one camera. The 360-degree video data may be video captured by at least one camera.

The encoding apparatus processes the 360-degree video data to acquire a projected picture (S1110). The encoding apparatus may perform projection on a 2D image (or picture) according to a projection type for the 360-degree video data among various projection types, and acquire a projected picture. The projected picture may be referred to as a projected frame. The various projection types include equirectangular projection (ERP), cube map projection (CMP), icosahedral projection (ISP), octahedron projection (OHP), truncated square pyramid projection (TSP), segmented sphere projection (SSP), and equal area projection (EAP). The 360-degree video data may be mapped to faces of a 3D projection structure of each projection type, and the faces may be projected onto the projected picture. That is, the projected picture may include the faces of the 3D projection structure of each projection type. For example, the 360-degree video data may be projected onto the projected picture based on the CMP, in which case the 3D projection structure may be a cube. In this case, the 360-degree video data may be mapped to six faces of the cube, and the faces may be projected onto the projected picture. As another example, the 360-degree video data may be projected onto the projected picture based on the ISP, in which case the 3D projection structure may be an icosahedron. As another example, the 360-degree video data may be projected onto the projected picture based on the OHP, in which case the 3D projection structure may be octahedron. In addition, the encoding apparatus may perform processing such as rotating and reordering each of the faces of the projected picture, changing resolution of each face, and the like. Meanwhile, a flag indicating whether or not the projected picture includes a plurality of faces may be generated. The flag may be called a face availability flag.

The encoding apparatus derives a prediction mode of a target block in a target face of the projected picture (S1120). The encoding apparatus may perform prediction based on various prediction modes, and may derive an intra-prediction mode having an optimal rate-distortion (RD) cost as an intra-prediction mode for the target block. The intra-prediction mode may include two non-directional intra-prediction modes and 33 directional intra-prediction modes. The non-directional intra-prediction modes may include a planar mode and a DC mode, and the directional intra-prediction modes may include intra-prediction modes #2 to #34. The encoding apparatus may generate information on the prediction mode of the target block in the target face. The information on the prediction mode may include index information indicating an intra-prediction mode for the target block.

In addition, the encoding apparatus may determine whether a reconstructed block exists among neighboring blocks of the target block in the target face. If there is no reconstructed block among the neighboring blocks, the encoding apparatus may derive either as a DC mode or as a planar mode as the prediction mode of the target block. Alternatively, if there is no reconstructed block among the neighboring blocks, the prediction mode of the target block may be derived as an inter-prediction mode.

The encoding apparatus derives reference samples for the target block in the reference frame of the projected picture (S1130). The face index of the reference face may be different from a face index of the target face. Further, on the projected picture, the target face may not be adjacent to the reference face. The encoding apparatus may derive the reference samples for the target block in the reference frame of the projected picture. Here, the target face and the reference face may be adjacent to each other on a three-dimensional spherical surface.

Specifically, for example, the reference samples for the target block may be derived from a reconstructed block having the same boundary as the target block on the 3D projection structure, among the reconstructed blocks included in the reference face of the target face. The target face and the reference face may be adjacent to each other on the 3D projection structure, and when the target block is a block adjacent to the boundary between the target face and the reference face, there may be a reconstructed block having the same boundary as the target block on the 3D projection structure among the reconstructed blocks included in the reference face. In this case, the reconstructed block may include 360-degree video data successive to the 360-degree video data included in the target block, and reconstructed samples of the reconstructed block may be derived as the reference samples.

For example, if the 360-degree video data is projected based on the CMP, the encoding apparatus may derive reconstructed samples of the reconstructed block having the same boundary as the target block on the cube as reference samples, among the reconstructed blocks included in the reference face of the target face. Meanwhile, if the 360-degree video data is projected based on the CMP and the reference samples for the target block are derived from the reference face in the projected picture, the target block may be adjacent to the upper boundary of the target base and the reference samples may be adjacent to the left boundary of the reference face. Alternatively, the target block may be adjacent to the left boundary of the projected picture, and the reference block including the reference samples may be adjacent to the upper boundary of the projected picture. Alternatively, the target face may be adjacent to a right boundary of the projected picture, and the reference face may be adjacent to a left boundary of the projected picture.

In another example, when the 360-degree video data is projected based on the ISP, the encoding apparatus may derive reconstructed samples of a reconstructed block having the same boundary as the target block on the icosahedron among the reconstructed blocks included in the reference face of the target face. As another example, when the 360-degree video data is projected based on the OHP, the encoding apparatus may derive reconstructed samples of a reconstructed block having the same boundary as the target block on the octahedron, among the reconstructed blocks included in the reference face of the target face.

In addition, the reference samples for the target block may be derived from the reference frame in the following cases.

For example, when the upper or left neighboring sample of the target block is located on an invalid face of the projected picture, the reference samples for the intra-prediction of the target block may be derived from the reference face. When intra-prediction is applied to the target block, the encoding apparatus may derive upper neighboring samples, upper left neighboring samples, and/or left neighboring samples of the target block. The target face may include a plurality of blocks and may be coded on a block basis. For example, the block may be a coding unit (CU). The plurality of blocks may be coded according to a z-scan order, and the target block may be included in the plurality of blocks. An upper or left neighboring sample of the target block may be located on an invalid face of the projected picture. That is, the upper or left neighboring sample of the target block may be an invalid sample. The invalid sample may represent a sample that does not include the 360-degree video data. That is, the invalid sample may represent a sample to which the 360-degree video data is not mapped, and the invalid sample may have a specific sample value. A face including only the invalid sample may be represented as the invalid face. Thus, if the upper or left neighboring sample of the target block on the projected picture is located on an invalid face, the upper or left neighboring sample may not be appropriate as the reference sample for intra-prediction, and thus, the reference samples for the intra-prediction of the target block may be derived from the reference frame.

In another example, if the upper or left neighboring sample of the target block is not available on the projected picture, the reference samples for the intra-prediction of the target block may be derived from the reference face. For example, a case where the upper or left neighboring sample of the target block is not available may include a case where the upper or left neighboring sample is located outside the boundary of the projected picture.

Meanwhile, it may be determined whether a reconstructed block is present among the neighboring blocks of the target block in the target face, and if there is a reconstructed block among the neighboring blocks, the encoding apparatus may derive reconstructed samples of the reconstructed block as reference samples. In addition, information indicating a face index of the reference face may be generated.

The encoding apparatus derives predicted samples of the target block based on the reference samples in the reference frame (S1140). The encoding apparatus may derive the predicted samples for the target block based on the reference samples. The encoding apparatus may derive the predicted sample based on a reference sample located in a prediction direction of the prediction mode of the target block among the reference samples.

The encoding apparatus generates 360-degree video information for the projected picture, encodes the generated 360-degree video information, and outputs the encoded 360-degree video information (S1150). The encoding apparatus may generate the 360-degree video information for the projected picture, encode the 360-degree video information, and output the encoded 360-degree video information through a bitstream. The 360-degree video information may include information on the target face. Specifically, the 360-degree video information may include information indicating a width of the target face and may include information indicating a height of the face. The 360-degree video information may also include information indicating the number of faces of the projected picture in a row in which the faces are arranged and information indicating the number of faces of the projected picture in a column in which the faces are arranged. In addition, the 360-degree video information may include a flag indicating whether the target face is an invalid face. The flag may be referred to as a face_invalid_flag. In addition, the 360-degree video information may include information indicating whether or not the target face rotates, and may include information indicating a quantization parameter (QP) value of the target face. In addition, the 360-degree video information may include information indicating a face index of the reference face of the target face. The syntax including the 360-degree video information may be derived as illustrated in Table 2 above.

In addition, the 360-degree video information may include information indicating a projection type of the projected picture. The projection type of the projected picture may be one of a plurality of projection types, and the plurality of projection types may include equirectangular projection (ERP), cube map projection (CMP), icosahedral projection (ISP), octahedron projection (OHP), truncated square pyramid projection (TSP), segmented sphere projection (SSP), and equal region projection (EAP). Meanwhile, a flag indicating whether the projected picture includes a plurality of faces may be generated, and the flag may be included in the 360-video information. The flag may be called a face availability flag. In addition, the 360-degree video information may include information on a prediction mode of a target block in the target face. The information on the prediction mode may include index information indicating an intra-prediction mode for the target block.

Meanwhile, although not shown in the figure, the encoding apparatus may generate a residual sample based on the original sample and the derived predicted sample. The encoding apparatus may generate information on the residual based on the residual sample. The information on the residual may include transform coefficients relating to the residual sample. The encoding apparatus may derive the reconstructed sample based on the predicted sample and the residual sample. That is, the encoding apparatus may derive the reconstructed sample by adding the predicted sample and the residual sample. Also, the encoding apparatus may encode the information on the residual and output the encoded information in the form of a bit stream. The bitstream may be transmitted to a decoding apparatus via a network or a storage medium.

Figure 12:
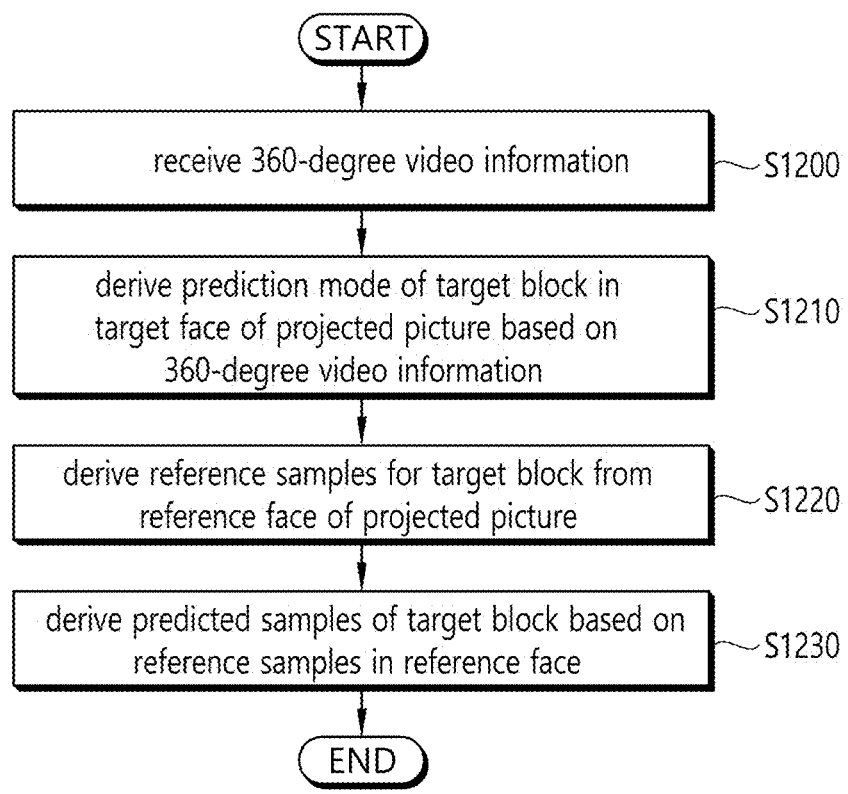
FIG. 12 schematically illustrates an intra-prediction method by a decoding apparatus according to the present invention.

FIG. 12 schematically illustrates an intra-prediction method by a decoding apparatus according to the present invention. The method disclosed in FIG. 12 may be performed by the decoding apparatus disclosed in FIG. 4. Specifically, for example, S1200 of FIG. 12 may be performed by an entropy decoder of the decoding apparatus, and S1210 to S1230 may be performed by a predictor of the decoding apparatus.

The decoding apparatus receives 360-degree video information (S1200). The decoding apparatus may receive the 360-degree video information through a bitstream. The 360-degree video information may include information on a target face of the projected picture. Specifically, the 360-degree video information may include information indicating a width of the target face and include information indicating a height of the face. The 360-degree video information may also include information indicating the number of faces of the projected picture in a row in which the faces are arranged and the number of faces of the projected picture in a column in which the faces are arranged. In addition, the 360-degree video information may include a flag indicating whether or not the target face is an invalid face. The flag may be referred to as a face_invalid_flag. In addition, the 360-degree video information may include information indicating whether or not the target face rotates, and include information indicating a quantization parameter (QP) value of the target face. In addition, the 360-degree video information may include information indicating a face index of the reference face of the target face. A syntax including the 360-degree video information may be derived as illustrated in Table 2 above.

In addition, the 360-degree video information may include information indicating a projection type of the projected picture. The projection type of the projected picture may be one of a plurality of projection types, and the plurality of projection types may include equirectangular projection (ERP), cube map projection (CMP), icosahedral projection (ISP), octahedron projection (OHP), truncated square pyramid projection (TSP), segmented sphere projection (SSP), and equal region projection (EAP). Also, the 360-degree video information may include a flag indicating whether the projected picture includes a plurality of faces. The flag may be called a face availability flag. In addition, the 360-degree video information may include information on a prediction mode of a target block in the target face. The information on the prediction mode may include index information indicating an intra-prediction mode for the target block.

The decoding apparatus derives a prediction mode of a target block in the target face of the projected picture based on the 360-video information (S1210). The decoding apparatus may derive an intra-prediction mode for the target block based on the information on the prediction mode acquired from the bitstream. The intra-prediction mode may include two non-directional intra-prediction modes and 33 directional intra-prediction modes. The non-directional intra-prediction modes may include a planar mode and a DC mode, and the directional intra-prediction modes may include intra-prediction modes #2 to #34.

In addition, the decoding apparatus may determine whether a reconstructed block exists among neighboring blocks of the target block in the target face. If there is no reconstructed block among the neighboring blocks, the prediction mode of the target block may be derived as one of the DC mode or the planar mode. Alternatively, if there is no reconstructed block among the neighboring blocks, the prediction mode of the target block may be derived as an inter-prediction mode.

The decoding apparatus derives reference samples for the target block from the reference frame of the projected picture (S1220). A face index of the reference face may be different from a face index of the target face. Further, on the projected picture, the target face may not be adjacent to the reference face. The decoding apparatus may derive the reference samples for the target block from the reference frame in the projected picture. Here, the target face and the reference face may be adjacent to each other on a three-dimensional spherical surface. Also, the 360-degree video information may include information indicating a face index of the reference face, and the reference face of the target face may be derived based on the information indicating the face index of the reference face.

Specifically, for example, the reference samples for the target block may be derived from a reconstructed block having the same boundary as the target block on the 3D projection structure among the reconstructed blocks included in the reference face of the target face. The target face and the reference face may be adjacent to each other on the 3D projection structure, and if the target block is a block adjacent to the boundary between the target face and the reference face, there may be a reconstructed block having the same boundary as the target block on the 3D projection structure among the reconstructed blocks included in the reference face. In this case, the reconstructed block may include 360-degree video data successive to the 360-degree video data included in the target block, and thus, the reconstructed samples of the reconstructed block may be derived as the reference samples.

For example, if the 360-degree video data is projected based on the CMP, the decoding apparatus may derive reconstructed samples of the reconstructed block having the same boundary as the target block on the cube as reference samples, among the reconstructed blocks included in the reference face of the target face. Meanwhile, if the 360-degree video data is projected based on the CMP and the reference samples for the target block are derived from the reference face in the projected picture, the target block may be adjacent to the upper boundary of the target base and the reference samples may be adjacent to the left boundary of the reference face. Alternatively, the target block may be adjacent to the left boundary of the projected picture, and the reference block including the reference samples may be adjacent to the upper boundary of the projected picture. Alternatively, the target face may be adjacent to a right boundary of the projected picture, and the reference face may be adjacent to a left boundary of the projected picture.

In another example, when the 360-degree video data is projected based on the ISP, the decoding apparatus may derive reconstructed samples of a reconstructed block having the same boundary as the target block on the icosahedron among the reconstructed blocks included in the reference face of the target face. As another example, when the 360-degree video data is projected based on the OHP, the encoding apparatus may derive reconstructed samples of a reconstructed block having the same boundary as the target block on the octahedron, among the reconstructed blocks included in the reference face of the target face.

In addition, the reference samples for the target block may be derived from the reference frame in the following cases.

For example, when the upper or left neighboring sample of the target block is located on an invalid face of the projected picture, the reference samples for the intra-prediction of the target block may be derived from the reference face. When intra-prediction is applied to the target block, the decoding apparatus may derive upper neighboring samples, upper left neighboring samples, and/or left neighboring samples of the target block. The target face may include a plurality of blocks and may be coded on a block basis. For example, the block may be a coding unit (CU). The plurality of blocks may be coded according to a z-scan order, and the target block may be included in the plurality of blocks. An upper or left neighboring sample of the target block may be located on an invalid face of the projected picture. That is, the upper or left neighboring sample of the target block may be an invalid sample. The invalid sample may represent a sample that does not include the 360-degree video data. That is, the invalid sample may represent a sample to which the 360-degree video data is not mapped, and the invalid sample may have a specific sample value. A face including only the invalid sample may be represented as the invalid face. Thus, if the upper or left neighboring sample of the target block on the projected picture is located on an invalid face, the upper or left neighboring sample may not be appropriate as the reference sample for intra-prediction, and thus, the reference samples for the intra-prediction of the target block may be derived from the reference frame.

In another example, if the upper or left neighboring sample of the target block is not available on the projected picture, the reference samples for the intra-prediction of the target block may be derived from the reference face. For example, a case where the upper or left neighboring sample of the target block is not available may include a case where the upper or left neighboring sample is located outside the boundary of the projected picture.

Meanwhile, it may be determined whether a reconstructed block is present among the neighboring blocks of the target block in the target face, and if there is a reconstructed block among the neighboring blocks, the decoding apparatus may derive reconstructed samples of the reconstructed block as reference samples.

The decoding apparatus derives predicted samples of the target block based on the reference samples in the reference frame (S1230). The decoding apparatus may derive the predicted samples for the target block based on the reference samples. The decoding apparatus may derive the predicted sample based on a reference sample located in a prediction direction of the prediction mode of the target block among the reference samples.

Meanwhile, although not illustrated in the figure, the decoding apparatus may immediately use the predicted sample as a reconstructed sample according to a prediction mode generate the reconstructed sample by adding a residual sample to the predicted sample. When there is a residual sample for the target block, the decoding apparatus may receive information on the residual for the target block, and information on the residual may be included in the information on the face. The information on the residual may include a transform coefficient relating to the residual sample. The decoding apparatus may derive the residual sample (or residual sample array) for the target block based on the residual information. The decoding apparatus may generate the reconstructed sample based on the predicted sample and the residual sample and may derive a reconstructed block or a reconstructed picture based on the reconstructed sample. Thereafter, in order to enhance subjective/objective image quality as necessary, an in-loop filtering procedure such as deblocking filtering and/or SAO procedure may be applied to the reconstructed picture as described above.

Meanwhile, although not illustrated in the drawings, the decoding apparatus may map the 360-degree video data of the decoded projected picture to a 3D space. That is, the decoding apparatus may re-project the projected picture to the 3D space.

According to the present invention described above, in the decoding of the projected picture for the 360-degree video, the reference samples for intra-prediction of the target block in the target face may be derived from the reference samples in the reference frame having a face index different from the target face, thereby enhancing prediction accuracy for the target block.

According to the present invention, in the intra-prediction of the target block in the target face of the projected picture, prediction may be performed based on the reference samples in the reference face adjacent to the target face on the three-dimensional spherical surface, thereby improving prediction accuracy and the overall coding efficiency.

In addition, according to the present invention, the projected picture may be derived according to the projection type suitable for the 360-degree video data among various projection types, thereby improving the overall coding efficiency.

In the above-described embodiment, the methods are described based on the flowchart having a series of steps or blocks. The present disclosure is not limited to the order of the above steps or blocks. Some steps or blocks may occur simultaneously or in a different order from other steps or blocks as described above. Further, those skilled in the art will understand that the steps shown in the above flowchart are not exclusive; that further steps may be included, or that one or more steps in the flowchart may be deleted without affecting the scope of the present disclosure.

The method according to the present invention described above may be implemented in software. The encoding apparatus and/or decoding apparatus according to the present invention may be included in a device that performs image processing, for example, for a TV, a computer, a smart phone, a set-top box, or a display device.

When the embodiments of the present invention are implemented in software, the above-described method may be implemented by modules (processes, functions, and so on) that perform the functions described above. Such modules may be stored in memory and executed by a processor. The memory may be internal or external to the processor, and the memory may be coupled to the processor using various well known means. The processor may comprise an application-specific integrated circuit (ASIC), other chipsets, a logic circuit and/or a data processing device. The memory may include a ROM (read-only memory), a RAM (random access memory), a flash memory, a memory card, a storage medium, and/or other storage device.

What is claimed is:

1. An intra prediction method for decoding a 360-degree video, the method comprising:
    receiving 360-degree video information that includes availability information of a face structure;
    deriving an intra prediction mode of a target block in a target face in a projected picture based on the 360-degree video information;
    deriving reference samples, for the target block, in a reference face in the projected picture based on information of a face of the projected picture, wherein, based on the availability information of the face structure representing that the face structure is used, the information of the face of the projected picture is signaled; and
    deriving prediction samples of the target block based on the reference samples in the reference face,
    wherein the information of the face of the projected picture comprises information representing a width of the face, information representing a height of the face, information representing a number of faces in each row in which the faces of the projected picture are arranged, information representing a number of faces in each column in which the faces of the projected picture are arranged, information of whether the face is invalid, information of whether the face is rotated, and information of a quantization parameter value of the face.

2. The method of claim 1, wherein a face index of the reference face is different from a face index of the target face.

3. The method of claim 2, wherein the 360-degree video information further includes information representing the face index of the reference face.

4. The method of claim 1, wherein the target face is not adjacent to the reference face in the projected picture.

5. The method of claim 4, wherein, based on an upper or left neighboring sample of the target block being located on the face of the projected picture and the information indicating that the face is invalid, the reference samples for intra-prediction of the target block are derived from the reference face.

6. The method of claim 4, wherein, based on an upper or left neighboring sample of the target block being not used as a reference sample, the reference samples for intra-prediction of the target block are derived from the reference face.

7. The method of claim 4, wherein the target block is adjacent to an upper boundary of the target face, and the reference samples are adjacent to a left boundary of the reference face.

8. The method of claim 4, wherein the target block is adjacent to a left boundary of the projected picture, and a reference block including the reference samples is adjacent to an upper boundary of the projected picture.

9. The method of claim 1, wherein the target face and the reference face are adjacent to each other on a three-dimensional spherical surface.

10. The method of claim 1, further comprising:
determining whether a reconstructed block exists among neighboring blocks of the target block in the target face; and
deriving reconstructed samples of the reconstructed block as the reference samples if the reconstructed block exists among the neighboring blocks.

11. An intra prediction method for encoding a 360-degree video, the method comprising:
acquiring 360-degree video data captured by at least one camera;
processing the 360-degree video data to acquire a projected picture;
deriving an intra prediction mode of a target block in a target face of the projected picture;
deriving reference samples for the target block from a reference face of the projected picture;
deriving prediction samples of the target block based on the reference samples in the reference face;
generating 360-degree video information for the projected picture; and
encoding the generated 360-degree video information, and outputting the encoded information,
wherein the 360-degree video information comprises availability information of a face structure and information of a face of the projected picture,
wherein, based on the availability information of the face structure representing that the face structure is used, the information of the face of the projected picture is signaled, and
wherein the information of the face of the projected picture comprises information representing a width of the face, information representing a height of the face, information representing a number of faces in each row in which the faces of the projected picture are arranged, information representing a number of faces in each column in which the faces of the projected picture are arranged, information of whether the face is invalid, information of whether the face is rotated, and information of a quantization parameter value of the face.

12. The method of claim 11, wherein the target face is not adjacent to the reference face in the projected picture.

13. The method of claim 12, wherein, based on an upper or left neighboring sample of the target block being located on a face where the information indicates that the face is invalid, the reference samples for intra-prediction of the target block are derived from the reference face.

14. The method of claim 11, wherein the target face and the reference face are adjacent to each other on a three-dimensional spherical surface.

* * * * *